Jan. 3, 1956   H. H. MUELLER   2,729,455
AUTOMATIC INTERLOCKING DUAL PHONOGRAPH RECORD PLAYER
Filed June 9, 1949   7 Sheets-Sheet 1

Inventor

Herman H. Mueller

By Clarence A. O'Brien
and Harvey B. Jacobson
Attorneys

Jan. 3, 1956  H. H. MUELLER  2,729,455
AUTOMATIC INTERLOCKING DUAL PHONOGRAPH RECORD PLAYER
Filed June 9, 1949  7 Sheets-Sheet 2

Inventor
Herman H. Mueller

By Clarence A. O'Brien
and Harvey B. Jacobson
Attorneys

Jan. 3, 1956 H. H. MUELLER 2,729,455
AUTOMATIC INTERLOCKING DUAL PHONOGRAPH RECORD PLAYER
Filed June 9, 1949 7 Sheets-Sheet 4

Inventor
Herman H. Mueller
By Clarence A. O'Brien
and Harvey B. Jackson
Attorneys Jan. 3, 1956   H. H. MUELLER   2,729,455
AUTOMATIC INTERLOCKING DUAL PHONOGRAPH RECORD PLAYER
Filed June 9, 1949   7 Sheets-Sheet 5

Inventor
Herman H. Mueller
By Clarence A. O'Brien
and Harvey B. Jacobson
Attorneys Jan. 3, 1956     H. H. MUELLER     2,729,455
AUTOMATIC INTERLOCKING DUAL PHONOGRAPH RECORD PLAYER
Filed June 9, 1949     7 Sheets-Sheet 6

Inventor
Herman H. Mueller
By Lawrence A. O'Brien
and Harvey B. Jacobson
Attorneys Jan. 3, 1956   H. H. MUELLER   2,729,455
AUTOMATIC INTERLOCKING DUAL PHONOGRAPH RECORD PLAYER
Filed June 9, 1949   7 Sheets-Sheet 7

Inventor
Herman H. Mueller
By *Clarence A. O'Brien and Harvey B. Jacobson*
Attorneys United States Patent Office
2,729,455
Patented Jan. 3, 1956

2,729,455

AUTOMATIC INTERLOCKING DUAL PHONOGRAPH RECORD PLAYER

Herman H. Mueller, Ephrata, Pa.

Application June 9, 1949, Serial No. 98,048

12 Claims. (Cl. 274—10)

This invention relates to an automatic phonographic apparatus and is particularly designed and constructed for automatically playing a plurality of phonographic records, either of the conventional sizes or the micro-groove long playing type.

The primary object of this invention is to play both the top and underside of a stack of records in a sequential manner, without manually or mechanically changing the normal horizontally disposed playing position of the record.

Another important object of this invention is to play both sides of a record disc, without changing the normal position of the record and, in this manner, to play a plurality of records in a continuous and constant sequence.

Another important object of this invention is to play, transfer and handle a stack of records in a safe and yet non-interrupted manner, so that scratching, excessive wearing or distortion of the sound track or breakage and multilation of the records is avoided.

Another important object of this invention is to lower a record into playing position from the stack of records in a noiseless and protected manner and to rotate the record at the proper speed, thereby adding to the quality of the reproduction of the sound track.

It is conventional in the art to play a plurality of stacked records by sequentially lowering or dropping the records one by one down onto the turntable, the records of the group being played on one side only. Further, it is conventional in the art to selectively or sequentially play the top and underside of a record disc released onto the turntable from an upper stack of records by either manually or mechanically raising and turning the record. Thus, retaining members have been provided for gripping and swinging a record in an arcuate path so as to move the record from one horizontal position on the turntable with one side being played into an opposing position in order to enable the other side to be played. Further, devices have been taught for retaining the record in a vertical rotatable position so that a pair of tone arms can selectively contact either of the sides of the record. However, such foregoing apparatuses necessitate a large number of mechanical parts and movements and thus, require considerable space and are expensive both in construction and purchase. Further, the sound tracks of the records are frequently distorted and the records are subjected to destructive wear and mutilation due to the excessive mechanical handling thereof.

It is the primary aim and purpose of the instant invention to enable a plurality of records to be played on both sides in a novel and wearless manner, free from subjection to destruction and with perfect and positive rotation or propulsion. Thus, this invention contemplates the playing of both sides of a stack of records without changing the horizontal position of the record to be played by swinging the tone arm horizontally and vertically, so that the needles or styluses carried by the tone arm are brought into reproducing contact with the playing surfaces on the top and lower sides of the record. Thus, means is provided for spacing the record to be played from the turntable and for rotating the record responsive to rotation of the turntable, so that the tone arm may reproducingly ride on the sound track formed on the underside of the record and on the top side of the record in a sequential manner. The turntable is formed or covered with a novel clutch surface and the records are also formed with complementary clutch or interlocking surfaces adapted to interlock with the clutch surface on the turntable in a manner as disclosed in my co-pending application, Serial No. 726,934, filed February 6, 1947. Connecting and spacing means, which may consist of an arm having a plurality of vertically disposed idler rollers having undulated peripheries, is pivotally disposed adjacent the turntable and is adapted to be moved into and out of interposition between the turntable and record to be played. Thus, the record is seated on the undulated peripheries of the rollers and is supported in a spaced manner above the turntable and is rotated responsive to the turntable by the connecting means. A pressure arm is pivotally carried adjacent the turntable and is adapted to swing inwardly and seat on the top of the record to be played and hold the record in firm engagement of the connecting means. An auxiliary resistance arm is carried by the main pressure arm and is adapted to extend radially across the sound track formed on the top surface of the record, when the underside is being played so that a firm and unyielding surface is presented to the stylus riding in the grooves on the underside of the record. The tone arm is pivotally disposed adjacent the turntable and is moved vertically and horizontally in a curvilinear path so as to swing inwardly and outwardly in a horizontal plane and to swing upwardly and downwardly beyond the periphery of the record. The tone arm is provided with a plurality of extending needles, the needles or styluses being adjustably carried by the tone arm and extending diagonally from the upper and lower surface of the outer or free end thereof, so that the tone arm may operatively contact the top side and underside of the record to be played. Novel slicing means is provided for separating the lowermost record from the stack on the spindle above the turntable and for lowering the record into placement on the peripheries of the rollers, which constitute the connecting and spacing means. Also, novel release means is provided for raising the record from driven engagement with the connecting means.

Generally speaking, the operation of the record changing and playing mechanism will be constant and uninterrupted in a sequential manner, so that the various moving parts will be inoperative during the actual playing of the record, when the record will be rotated by the idler rollers driven by the turntable and the tone arm will ride inwardly relative to the center opening of the record through the engagement of the sound track by the stylus or needle.

As the tone arm is swung downwardly and inwardly so as to bring the needle extending upwardly from the outer end of the tone arm into engagement in the starting groove of the sound track, a flexible pressure arm is swung inwardly relative to the spindle and embraces the spindle, the arm having anti-friction means formed at its outer or free end, said means being adapted to rest upon the center portion of the record, which is concentrically interposed between the center opening and the sound track. The pressure arm holds the record in positive engagement of the rollers, so that a true drive is provided between the turntable and the record. A resistance arm is pivotally associated with the pressure arm and extends radially from the center of the record to the outer periphery thereof and rests upon the upper sound record so that a firm and unyielding surface is presented to the upper needle of the tone arm, which contacts the underside of the record.

After the underside of the record has been played, the tone arm is swung downwardly and outwardly to a rested position beyond the periphery of the record. Simultaneously, the pressure arm is raised and swung outwardly to a rested position in the opposite direction from the rested position of the tone arm. Lifting means, which is slidably disposed in a hollow spindle, is then moved upwardly to contact the center portion of the record and raise the record upwardly out of engagement with the connecting means or rollers. The arm, carrying the rollers, is then swung outwardly to a rested position, adjacent the position of the pressure arm. The record is then lowered onto the turntable by the lifting means, the clutch surface of the record interlocking with the clutch surface on the turntable. The tone arm is then swung inwardly and the record is played in a conventional manner by the stylus extending downwardly and outwardly from the tone arm. After the top side of the record has thus been played, the tone arm is swung outwardly to its rested position.

At this time, slicing means extending upwardly from the top of the cabinet and disposed adjacent the outer peripheries of the stack of records is brought into operation to release the lowermost record in the stack on the spindle. At the same time, the arm carrying the rollers is swung inwardly and then downwardly so as to bring the rollers into contact of the clutch surface of the record seated on the turntable. The record released from the stack, is allowed to drop downwardly on the spindle into a seated position on the peripheries of the rollers. The underside of the record is then played, as aforedescribed.

Referring now more particularly to the accompanying drawings, the structural details of the illustrated embodiment of this invention will be described.

A casing or cabinet 10 is provided for housing the operating mechanism with a conventional turntable 12 rotatably mounted on the top 14 of the casing. The turntable is constructed with a depending annular flange and is provided with a snug fitting covering 16 upon which is formed an annular undulated clutch surface 18. The records, of conventional construction, generally indicated by the reference numeral 20 are provided with integrally formed or detachable annular raised surfaces 22. The surfaces 22 are formed on the top side and underside of the records in concentric relationship to the center opening and are serrated or otherwise treated to form a frictional or clutch surface complementary interlockingly engageable with the clutch surface on the turntable covering.

A supporting plate 24 is secured as at 26 within an opening formed in the top 14 of the casing and a hollow spindle 28 is formed at its lower end with an annular laterally extending flange 30 seated on the supporting plate. The spindle terminates at its lower end, below the flange 30, in an externally threaded section 32 on which is threadingly disposed a locking nut 34, the nut abutting against the plate 24 to lock the spindle on the casing. A ball bearing unit 36 is concentrically disposed about the spindle above the flange 30 and supports a collar 38 formed on the turntable, the latter being provided with a center opening concentrically disposed on the spindle. The spindle terminates at its upper end in an enlarged socket 40 and a sleeve 42 is disposed about the spindle between the socket 40 and the turntable. Parallel vertically extending slots or guideways 44 and 46 are formed in the spindle above the socket section 40, the spindle terminating in a solid upper end 48 which has a non-circular axially aligned extension 50.

*Turntable driving means*

Means is provided for rotating the turntable in accordance with the type of record which is to be played. Thus, means is operatively disposed between the electric motor 52 and the turntable whereby the speed of the turntable may be selectively controlled in accordance with the size of the records. In this respect, a gear 54 is secured on the outer end of the upstanding drive shaft 56 from the motor 52 which is bolted on the bottom of the casing 10. A U-shaped bracket 58 has its opposing legs secured to the sides of the motor and spaced outwardly therefrom and a U-shaped bracket 60 is secured to the bracket 58 so that the webs of the two brackets are spaced vertically from each other. The gear 54 is rotatably disposed on the shaft 56 between the two brackets and intermeshes with a gear 62 secured on the lower end of a sleeved shaft 64. The shaft 64 extends upwardly through a collar 66 disposed vertically in the top 14 of the casing. A roller 68 is secured on the upper end of the shaft, the upper end of the shaft being rotatably journaled as at 70 in a rectangular plate 72 having a lateral extension 74. A large roller 76 is rotatably journaled at one corner of the plate and a smaller roller 78 is rotatably journaled at the opposing corner of the plate with a small roller 80 journaled on the intermediate corner. All of the rollers are so grouped as to present their peripheries in contact of the periphery of the roller 68 and are driven thereby. The large roller 76 rotates the turntable through the roller 68 and shaft 64 from the power means at the rate of 33 R. P. M., the roller 78 rotating the turntable at the rate of 45 R. P. M. and the roller 80 rotating the turntable at the rate of 78 R. P. M. The foregoing speed ratios are standard for 7 inch, 10 and 12 inch conventional records and micro-groove long playing records. An elongated arm 82 is slidably disposed within a bracket 84 secured on the underside of the top 14 of the casing. The bar has its opposing ends pivotally secured to upstanding pins 86 and 88, the pin 86 being pivotally secured to the extension 74 on the plate 72, while the pin 88 is slidably disposed in a slot 90 formed in the top 14 of the casing. A knob 92 is secured on the upper end of the pin and is slidably disposed on a plate 94 which is inscribed with the three points for identifying the operative and inoperative positions of the driven idler rollers for rotating the turntable. It is obvious that when the arm 82 is moved inwardly and outwardly relative to the center of the turntable, the plate 72 is pivoted around the pin 86 bringing the desired roller into driving contact of the inner surface of the depending flange on the turntable.

*Record driving and spacing means*

Figure 1:
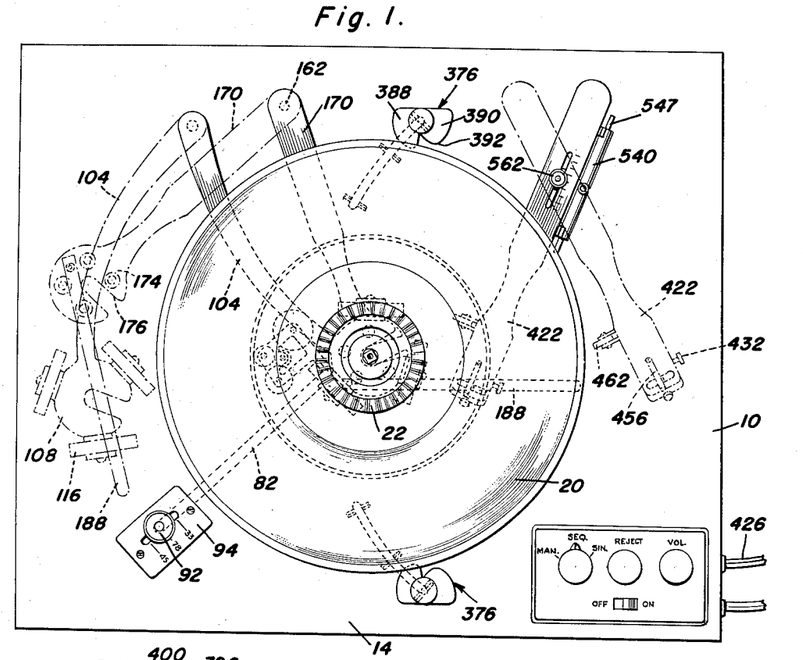
Figure 1 is a top plan view of an automatic phonographic apparatus constructed in accordance with the principles of this invention.
Figure 2:
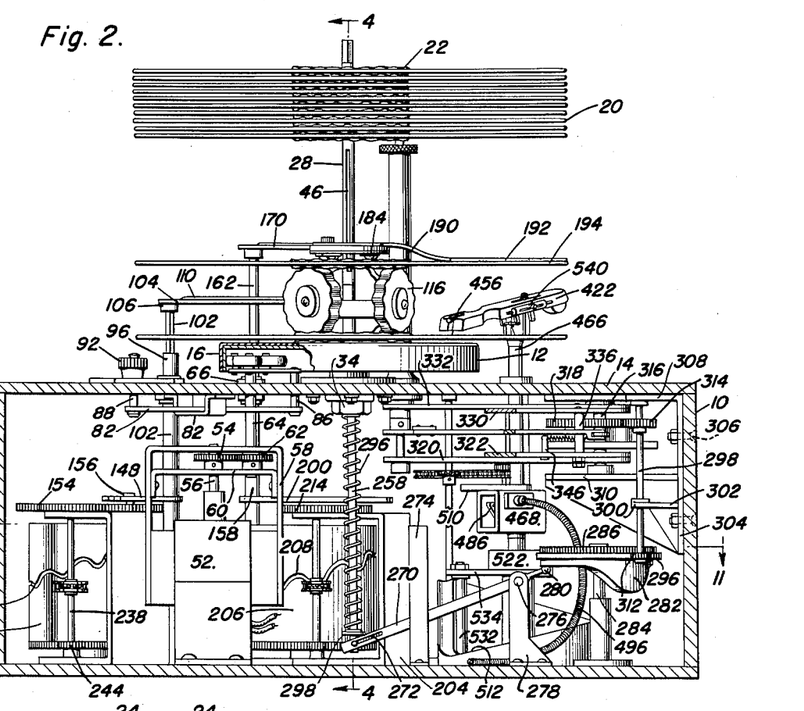
Figure 2 is a side elevational view thereof, with the casing or cabinet removed and shown in section so as to exposed the operating mechanism.
Figures 4, 5, 6, 32, 33:
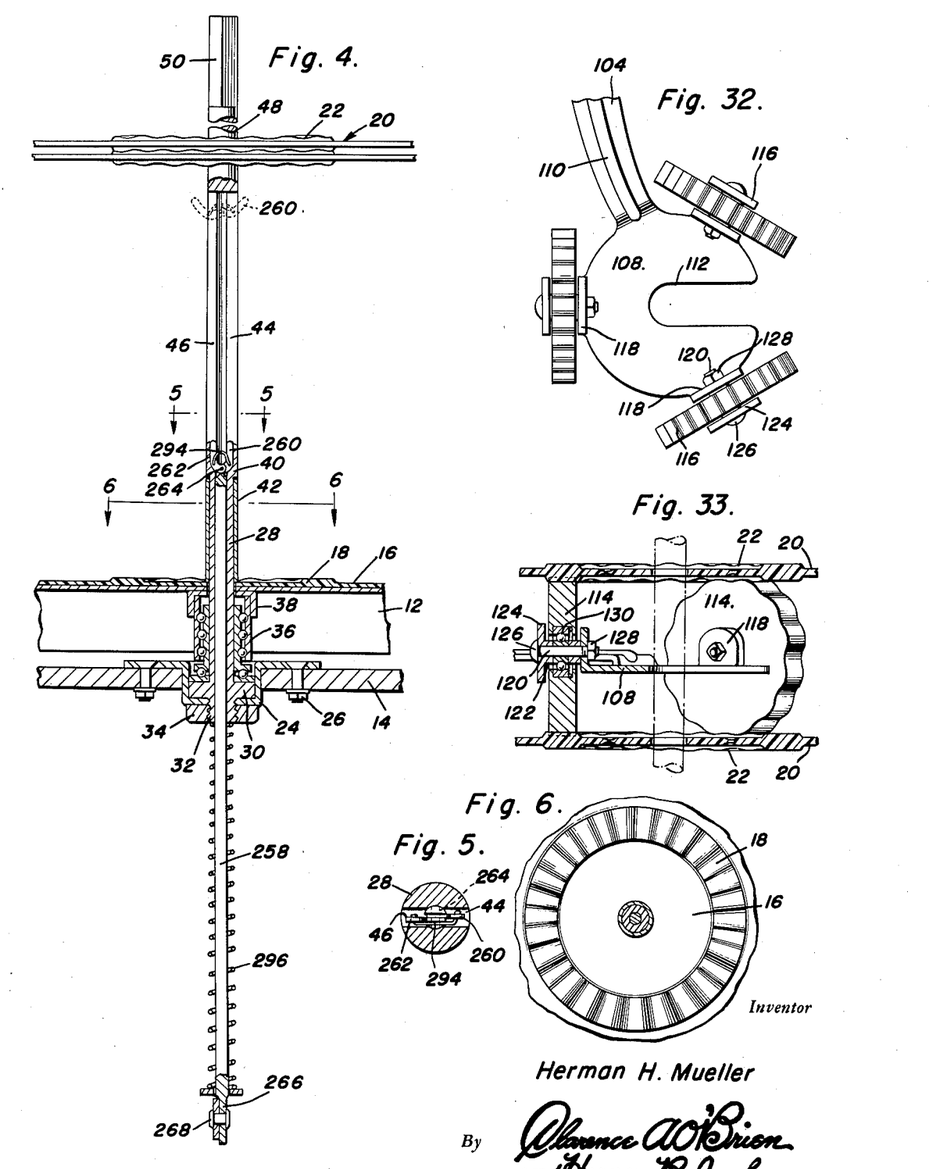
Figure 4 is an enlarged vertical sectional view taken on line 4—4 of Figure 2, and illustrating the means carried by the spindle for raising a record that has been played from engagement with the connecting and driving means and lowering the record into a non-playing position on the turntable.
Figure 5 is a transverse sectional view taken on line 5—5 of Figure 4.
Figure 6 is a transverse sectional view taken on line 6—6 of Figure 4 to illustrate the clutch or interlocking surface formed on the turntable, the clutch surface on the records being similar thereto and being formed to intermesh with the turntable surface or with the connecting and driving means interposed between the turntable and the record to be played.
Figure 32 is a fragmentary plan view of the connecting means adapted to be operatively interposed between the turntable and records.
Figure 33 is a vertical sectional view through the center of the turntable and playing record, illustrating the connecting means operatively disposed therebetween for spacing the playing record above the turntable and for rotating the same responsive to rotation of the turntable.

Attention is now directed to Figures 2, 32 and 33 for a detailed explanation of the means provided for drivingly connecting the turntable with a record to be played, the record being vertically spaced by the connecting means above the turntable, as illustrated in Figure 2. In this respect, a hollow shaft 96 is vertically disposed through the top 14 of the casing, the shaft being formed with a laterally extending annular flange 98 which is secured within a locking sleeve structure 100 so as to prevent vertical movement of the shaft. A square shaft 102 is slidably disposed within the shaft 96 and an arcuate arm 104 is provided at one end with a collar 106 which is secured on the upper end of the shaft 102. The arm 104 terminates at its other end in a circular plate 108. The arm 104 is rigidified by a longitudinally extending integral raised surface 110 and the plate 108 is formed with a radially disposed notch or cut-out section 112. The notch 112 is adapted to embrace the spindle, when the arm is moved inwardly relative to the center of the turntable. A plurality of rollers 114 are formed with undulated peripheries 116 and are rotatively journaled in equidistant fashion to the periphery of the plate 108. Thus, the plate is provided with equidistantly spaced upstanding apertured ears 118 through which a shaft 120 is transversely disposed so as to project laterally from the ears. A sleeve 122 is concentrically disposed on the pin or shaft 120 and is formed with a flange 124 against which the enlarged head 126 of the pin abuts, the opposing end of the pin being threadingly engaged in a locking nut 128. A ball bearing assembly 130 is interposed between the hub of the rollers 114 and the sleeves 122, so that the rollers are rotatively journaled on the sleeves and are held in a vertical plane surrounding the plate 108. As noted particularly in Figure 33, wherein the rollers are operatively interposed between a lower record seated on the turntable and an upper record, the rollers 114 are adapted to be vertically disposed between the records or between the turntable and a record, with the undulated peripheries thereof intermeshing with the clutch surfaces on the records and turntable.

Figure 11:
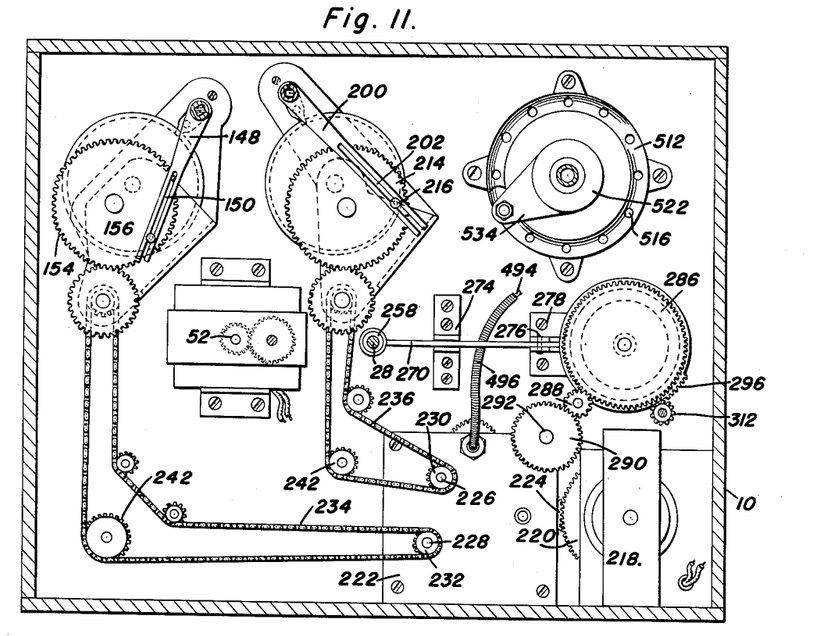
Figure 11 is a top plan view of the drive means for the connecting means and pressure arm.
Figure 12:
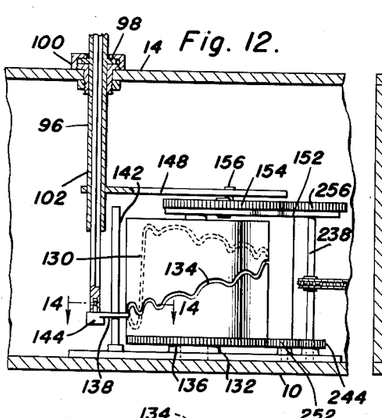
Figure 12 is a fragmentary side elevational view illustrating the means for oscillating and raising the connecting means.

Attention is now directed to Figures 11 and 12, wherein the means is illustrated for raising the arm 104 and for swinging the arm inwardly and outwardly relative to the spindle. In this respect, a cylindrical cam member 130 is rotatively journaled on a supporting plate 132 secured to the bottom of the casing 10, the cam being formed with a circumferentially disposed wavy or undulated cam groove or path 134 and being provided at its lower end with a concentric integral gear 136. The shaft 102 is formed at its lower end with a laterally extending finger 138, the finger having a vertical opening 140 slidably disposed on an upstanding rod 142. The rod is provided to retain the finger in the correct lateral position extending from the shaft 102. The finger 138 is secured on the end of the shaft 102 by means of a collar 144 which receives the end of the shaft and from which vertically extends a pin 146, the pin being disposed in a recess in the shaft and being keyed to the shaft.

An arm 148 is secured at one end integrally to the hollow shaft 96 and is formed at its opposing end with a longitudinally extending slot 150. A supporting plate 152 is horizontally disposed above the cam 130 and parallel with the upper end thereof, the supporting plate being anchored to the casing in any suitable manner. The upper end of the cam 130 is rotatively journaled to the supporting plate and a gear 154 is rotatively disposed, in a superimposed manner, on the supporting plate directly above the cam 130. A pin 156 extends upwardly from the gear 154 and is eccentrically disposed thereon, the pin being integrally formed adjacent the teeth of the gear. The slot 150 in the arm 148 is slidably disposed on the pin 156 and, as the gear 154 is rotated, through a means to be later described, the arm 148 is oscillated in a curvilinear path.

The arm 148 is oscillated thereby oscillating the hollow shaft 96 and swinging the arm 14 inwardly and outwardly above the turntable. Of course, as the cam 130 is rotated by the integral gear 136, the finger 138 is progressively moved in the undulated groove, which extends spirally around the periphery of the cam to a high point and then drops downwardly to the lowest point, as seen in Figure 12. In this manner, the shaft 102 is raised progressively, for a purpose to be later described.

*Pressure arm*

Figures 22, 24:
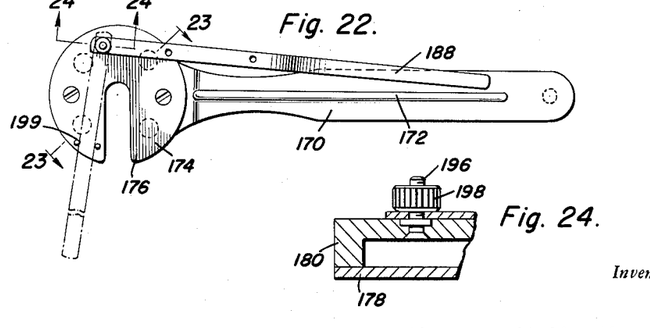
Figure 22 is a top plan view of the pressure arm.
Figure 24 is an enlarged detail sectional view taken on line 24—24 of Figure 22.
Figure 23:
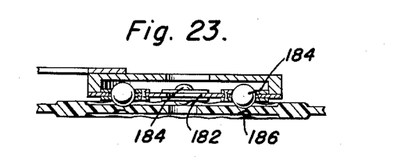
Figure 23 is a transverse sectional view taken on line 23—23 of Figure 22.

Attention is now directed to Figures 22–23 and Figure 2 for a detailed explanation of the pressure arm, which is adapted to swing inwardly and rest upon the top of a record being played on the underside so as to hold the record in positive engagement of the connecting rollers and to present a firm and unyielding surface to the stylus carried by the tone arm.

Thus, an elongated sleeve 158 is rotatively disposed through a retaining sleeve structure 160, the construction being similar to that for the hollow shaft 96, illustrated in Figure 12. A shaft 162 is slidably disposed through the sleeve and is provided with a lateral key or finger 164 slidably disposed in a vertical slot or guideway 166 in the sleeve 158. A spring steel arm 170 is secured on the upper end of the shaft 162 and is formed with a rigidifying longitudinally extending rib 172. The arm 170 terminates at its free end in a circular plate 174 which is formed with a radial slot 176, which is adapted to embrace the spindle as shown in Figure 2. A perforated plate, having a similar radial opening, is secured to the depending annular flange 180 on the plate 174. Sleeves 182 are secured in the openings in the plate 178 and support ball bearings 184. The ball bearings 184 are adapted to ride in a circular groove 186 formed on the records 20, concentric to the center opening of the records. However, the groove may be dispensed with and the ball bearings may rest on the center portion of the record within the annulus 22 having the clutch surface thereon. An elongated arm 188 is pivotally carried at one end by the upper surface of the plate 174 and extends downwardly and outwardly therefrom as at 190 to terminate in a flat end 192 having a felt covering 194 on the lower surface thereof. The arm 192 is adapted to ride on the sound track on the upperside of the record, when the underside is being played, so as to retain the record in a true horizontal plane. The arm is secured to the plate 174 by a bolt 196 and thumb screw 198 and is locked in an operative position by protuberances 199.

The sleeve 158 is formed at its lower end with an integral lateral extending arm 200, which has a longitudinally extending slot 202 formed in its opposing end. A U-shaped bracket 204 is secured to the base of the casing 10 at one of its legs and a cylindrical cam 206 is rotatively journaled between the opposing legs of the bracket. The cam is formed with a circumferentially disposed spirally arranged undulated groove 208, similar to the construction of the cam 130. A finger 210 is integrally carried in lateral fashion by the lower end of the shaft 162 and is adapted to ride in the groove, the finger being vertically guided by an upstanding shaft 212. A gear 214 is rotatably mounted on the upper leg of the bracket and is formed with an upstanding lug 216, the lug being slidably disposed within the slot 202 of the arm.

In operation, as the cam 206 is rotated, the shaft 162 is progressively raised, thus raising the arm 170. The arm 170 is oscillated by the arm 200 and sleeve 158 responsive to rotation of the gear 214 by a means to be described.

*Drive means for pressure arm and connecting means*

Figure 13:
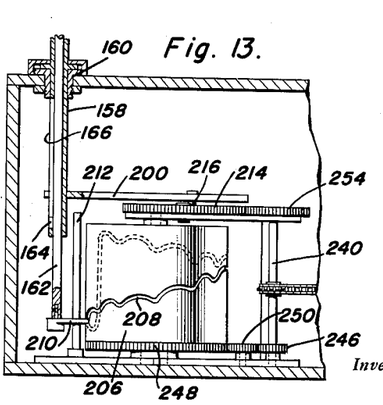
Figure 13 is a fragmentary side elevational view of the means for oscillating and selectively raising or lowering the pressure arm.
Figure 14:
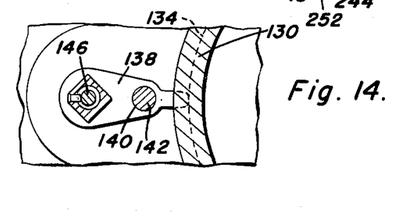
Figure 14 is a sectional view taken on line 14—14 of Figure 12.
Figure 15:
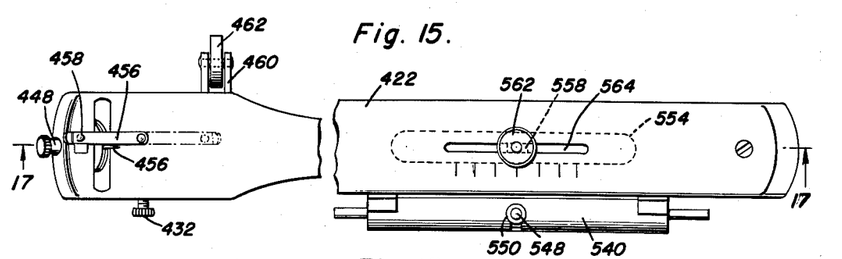
Figure 15 is a top plan view of the tone arm.

Attention is directed to Figures 11–13 for a detailed description of the drive means for the connecting means and the pressure arm. In this respect, an electric motor 218 is mounted within the casing and a gear 220 is driven thereby. A gear box and timer of conventional construction 222 is located adjacent to the motor and an outer gear 224 carried thereby is disposed in intermeshing engagement with the gear 220. Shafts 226 and 228 extend upwardly from the gear box and are provided with sprockets 230 and 232 on their outer ends. Chains 234 and 236 are entrained over the sprockets and are drivingly connected to shafts 238 and 240 journaled in the brackets for the cams 130 and 206. Idler guide sprockets 242 are provided at the middle of the chains, so that the chains are disposed in right angular traveling arrangement. Gears 244 and 246 are journaled on the shafts and are drivingly connected to the gears 136 on the cam 130 and the gear 248 on the lower end of the cam 206 by idlers 250 and 252. Gears 254 and 256 are journaled on the upper ends of the shafts 240 and 238 and are disposed in intermeshing engagement of the gears 214 and 154. Thus, the same drive transmission means from the timer and gear box is employed for rotating the cams 130 and 206 and for rotating the gears 154 and 214 to thereby effect an upwardly extending movement of the shaft 162 and an oscillating movement thereof. It is to be particularly noted that the gear ratio between the gear drive for the cams and for the gears 214 and 154 is such that the hollow shafts and, correspondingly the shafts 102 and 162, are oscillated counterclockwise and clockwise to swing their corresponding arms 104 and 170 inwardly and outwardly relative to the spindle while the fingers 210 and 138 are moved upwardly in the spiral undulated grooves one progressive step at a time. Thus, the same drive means may be employed for swinging the arms inwardly and outwardly and for raising the arms as the stack of records is lowered onto the turntable and the height therefore of the turntable is increased.

*Record release and lowering mechanism*

As seen in Figure 4, a rod 258 is slidably disposed within the spindle and is provided at its upper end with a pair of arcuate fingers 260 and 262 commonly pivoted as at 264 to the upper end of the rod and adapted to seat within the socket 40. The fingers are adapted to spread outwardly through the slots 44 and 46 and engage a record resting upon the rollers 116 to lift the same from driving engagement with the undulated peripheries of the rollers and allow the arm 104 to be swung outwardly.

In this respect, attention is also directed to Figure 2, wherein it is to be noted that the rod 258 terminates in a flat lower end 266 which is pivotally secured by a rivet 268 to a rocker arm 270, the rivet being disposed in a slot 272 formed in one end of the arm. The arm extends through a vertical slotted guide bar 274, which is secured to the base of the casing. The arm is pivotally mounted on a horizontal axis as at 276 to the upper end of a supporting bracket 278 and terminates in a cam follower 280. The follower 280 is disposed in contact with a cam 282 which is rotatively mounted in a horizontal plane on a vertical shaft 284 and is provided with a gear 286 integrally seated on the upper end thereof. The gear 286 is operatively connected to a driving gear 290 mounted on a shaft 292 extending upwardly from the gear box 222 by an idler 288. Thus, as the cam 282 is rotated through the gearing the arm 270 is rocked about its horizontal pivot 276 and the rod 258 is moved upwardly. As the rod moves upwardly, a spring 294 urges the fingers 260 and 262 apart so that the fingers project laterally beyond the periphery of the spindle through the slots 44 and 46 and engage the record resting on the rollers and lift the record upwardly, so that the roller arm 104 may be raised and swung outwardly beyond the periphery of the turntable to a rested position. A spring 296 is concentrically disposed about the rod 258 between the locking nut 34 and a stop plate 298 formed on the lower end thereof, the spring functioning to move the rod downwardly within the casing after the head 280 of the rocker arm moves off the cam rise.

A gear segment 296 is formed on the cam parallel with the teeth of the gear 286. A shaft 298 is oscillatably disposed in a vertical plane in a bearing collar 300, which extends laterally from an arm 302 secured to a supporting plate 304 which is bolted as at 306 to one of the sides of the casing. The supporting plate 304 is provided with laterally extending vertically spaced horizontally disposed shelves 308 and 310 for a purpose to be described. The shaft 298 has a gear 312 secured on the lower end thereof in engagement with the segment 296 and a gear 314 secured on the upper end thereof. A shaft 316 is vertically disposed between the shelves 310 and 308 and carries a horizontally disposed gear 318, which intermeshes with the gear 314.

A pair of outwardly diverging arms 320 and 322 are secured at one end on the shaft 316 and support at their opposing transversely spaced ends a pair of vertical shafts 324 and 326. The arms 320 and 322 are formed at their outer ends with retaining sockets 328 within which the lower ends of the shafts are rotatably journaled. A similar pair of supporting arms 330 and 332 extend outwardly parallel with the arms 320 and 332 from the shaft 316 and are provided with apertured ends through which the shafts 324 and 326 are rotatably disposed. A cam 334 is formed integrally on the underside of the gear 318 and is rotated by the gear through the shaft 298 operatively associated therewith. The parallel sets of vertically spaced arms are joined by vertically disposed pins 336, the pins being disposed adjacent the commonly journaled ends of the arms. A pair of crank arms 338 and 340 are pivotally journaled on the pins and are provided at their inner ends with cam followers 342 and 344, which contact the periphery of the cam wheel 334. Pins 346 extend upwardly from the arms 320 and 322 and springs 348 are anchored between the upper ends of the pins and the inner ends of the crank arms to retain the cam followers in engagement of the cam wheel. The opposing ends of the crank arms are pivotally secured to links 350 which are pivoted to stub arms 352. The latter are formed with a collar 354 secured by a set screw 356 concentrically on the shafts 326.

Figure 3:
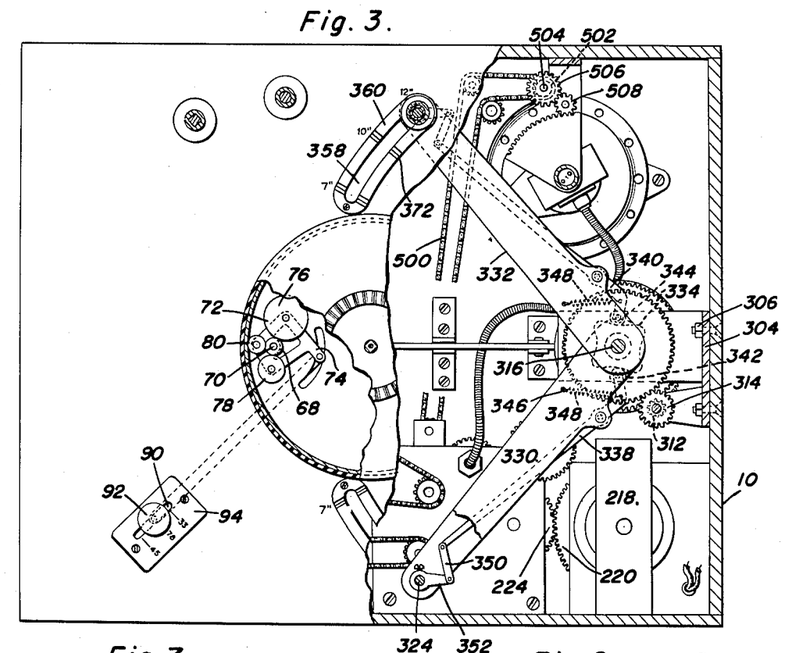
Figure 3 is a top plan view with a portion of the top of the cabinet or casing removed to illustrate in plan the operating mechanism.

A pair of elliptical shaped plates 360 are secured in the top 14 of the casing adjacent the opposing sides thereof and are provided with longitudinally extending slots 358. A sleeve 362 is concentrically disposed about the shaft 326 and is formed with a lateral flange 364 at its lower end, the flange preventing upward movement of the sleeve from the slot 358. The sleeve and shaft are slidably disposed in the slot with an outer sleeve 366 concentrically disposed about the sleeve 362 and having an enlarged end 368 seated on the upper edge of the plate 360 adjacent the edges of the slat. The sleeve 362 is externally threaded at its upper end and a locking nut 370 is threaded thereon and seated within the sleeve 366. It is to be particularly noted that the plate 360 is formed with sets of transversely aligned notches 372 within which the tongues 374 extending downwardly from the base 368 of the sleeve 366 are adapted to seat. Thus, the arms, as noted in Figure 3, can be swung inwardly, thereby bringing all of the linkage structure inwardly depending upon the size of the records stacked on the spindle. In moving the arms in the slot, the lock nut 370 is loosened thereby allowing the sleeve 366 to be moved upwardly and allowing the entire shaft and sleeve assembly to be slidably moved in the slot and positioned in the position corresponding with the diametrical size of the records, so that the record release means 376 carried by the upper ends of the shafts 326 are moved into their proper position relative to the periphery of the various sized records.

Figures 7, 8, 9, 10:
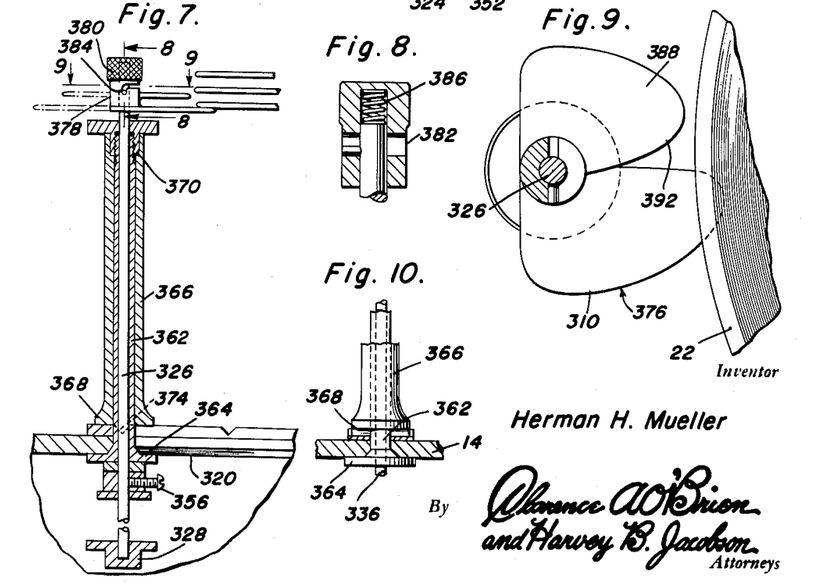
Figure 7 is a vertical sectional view in detail of the supporting means for the selecting knives and blades, which are shown in elevation.
Figure 8 is an enlarged vertical sectional view taken on line 8—8 of Figure 7.
Figure 9 is an enlarged sectional view taken on line 9—9 of Figure 7 and illustrating in plan the selecting knives or blades.
Figure 10 is an enlarged elevational view of the lower portion of the supporting posts for the knives.

The record release means 376 includes a collar 378 having an integral knurled closed end 380. The collar is formed with a bayonet slot 382 engageable on the pins 384 extending laterally from the upper end of the shaft 326. A spring 386 is retained in the knurled end 380 and is engageable against the upper end of the shaft 326 for locking the collar on the shaft. A pair of blades 388 and 390 integrally project laterally from the collar 378, the blades being vertically spaced and having substantially ovid outer ends 392. In operation, as the shaft 298 is rotated, it imparts rotation to the gear 318 and the cam wheel 334 is correspondingly rotated to move the crank arms outwardly and, through the link 350 and arm 352, oscillate the shafts 324 and 326 in a similar manner. Oscillation of the shafts is imparted to the blades by the collar locked on the upper end of the shafts and the blades are swung inwardly and outwardly relative to the periphery of the lowermost record in the stack. Thus, with respect to Figure 9, it is to be noted that the record is retained by the outer end of the blade or knife 390. As the shaft 326 is oscillated in a clockwise rotative path, the outer end of the blade 390 is moved away from the underside of the record 22. The outer end of the blade 388 is correspondingly moved so as to engage the underside of the next record in the stack and hold it against downward movement on the spindle.

Micro-groove record spindle attachment

Figures 25, 26:
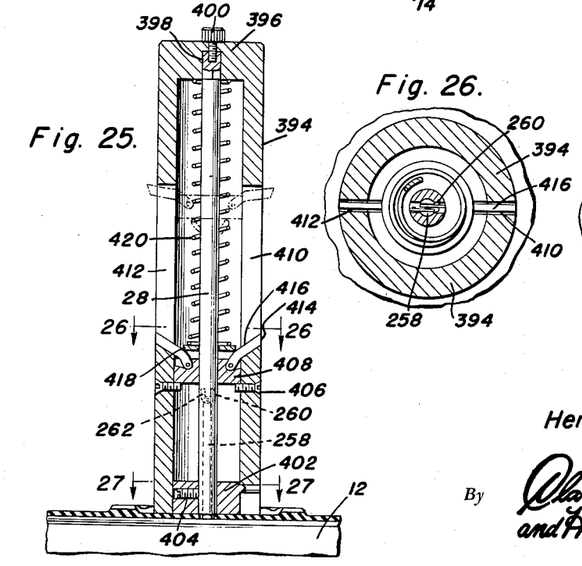
Figure 25 is a vertical sectional view of a spindle constructed for use in playing micro-groove long playing records.
Figure 26 is a transverse sectional view taken on line 26—26 of Figure 25.
Figure 27:
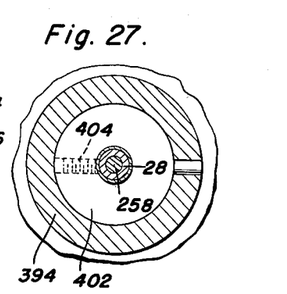
Figure 27 is a transverse sectional view taken on line 27—27 of Figure 25.

Attention is now directed to Figures 25–27, wherein an attachment for the spindle 28, illustrated in Figure 4, is shown. This attachment is provided, so that the micro-groove long playing records, which are formed with enlarged center openings, may be played in a manner similar to the conventional 10 or 12 inch records. Thus, a hollow post 394, having a closed upper end 396 is disposed concentrically about the spindle 28, the closed end of the post having a recess 398 for receiving the upper end of the spindle, the upper end being locked therein by a set screw 400.

A block 402 is disposed about the lower end of the spindle and seated on the turntable 12 and set screws 404 are radially disposed through the lower end of the post and the block frictionally engaging on the spindle, so that the post is locked on the spindle. A plurality of screws 406 are radially disposed through the post and project beyond the inner wall thereof to support a block 408 slidably disposed on the spindle 28. The post is formed with opposing vertically disposed slots 410 and 412, the lower edges of the slots being beveled upwardly as at 414. A pair of fingers 416 are pivotally carried by the block and are slidably disposed in the slots or guideways 410 and 412. Thus, upward movement of the shaft 258 forces the fingers 260 and 262 upwardly out of the socket 40 and the spring 294 urges or spreads them apart so that they engage on the underside of the block 408 and move the block upwardly on the spindle 28. As the block is moved upwardly, the fingers 416 are moved outwardly through the slots 410 and 412 and function to raise the long playing records on the post 394, in a manner similar to the operation of the fingers 260 and 262, as illustrated in Figure 4. A stop plate 418 is secured on the upper reduced end of the block 408 and a spring 420 is coiled concentrically around the spindle 28 between the upper end of the post and the block to function in a manner similar to the spring 296 on the shaft 258.

Tone arm and control means

Figure 16:
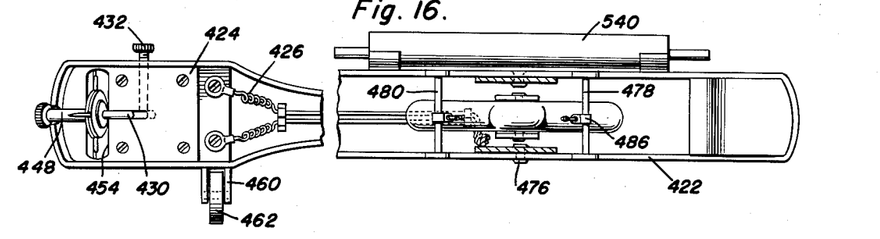
Figure 16 is a longitudinal sectional view taken on line 16—16 of Figure 17.
Figure 17:
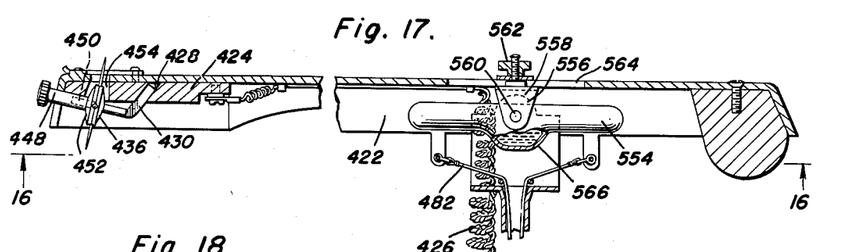
Figure 17 is a longitudinal vertical sectional view taken on line 17—17 of Figure 15.
Figure 18:
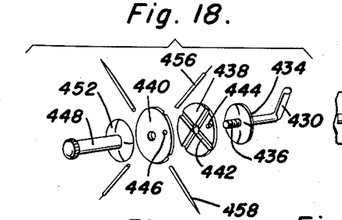
Figure 18 is an exploded perspective view of the stylus or needle supporting means.
Figure 19:
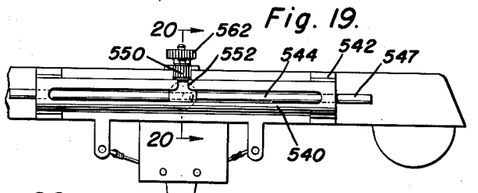
Figure 19 is a fragmentary elevational view of the means for adjusting the pressure imparted by the stylus on the sound track of the record.
Figure 20:
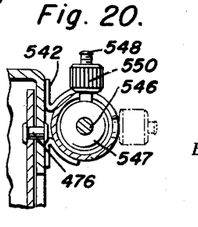
Figure 20 is a vertical sectional view taken on line 20—20 of Figure 19.

Attention is now directed to Figures 15–21 for an explanation of the tone arm and control means therefor. The tone arm 422 is provided with a vibration transmission block 424 which is secured in the head of the tone arm and conductors 426 are connected thereto and associated with in a conventional manner any well known type of speaker unit (not shown). A vertical slot 428 is formed in the block and one end of a right angular metal pin 430 is held therein by a set screw 432. A stop plate 434 is formed on the other end of the pin, the extremity of the end being externally threaded as at 436. A pair of complementary circular plates 438 and 440 are provided for holding the needles or styluses. The plates are formed on their inner surfaces with equidistant radially extending slots 442 within which the inner ends of the needles are received. A lug 444 projects outwardly from the plate 438 and is adapted to be received in an opening 446 in the plate 440 to align the complementary grooves, when the plates are disposed on the threaded end 436 of the pin 430. A locking member 448 is formed at its inner end with an internally threaded socket 450 to receive the end 436 and a stop plate 452 is integrally formed on the member to abut against the outer surface of the plate 440. The member 448 is disposed through the front of the head of the tone arm, as seen in Figure 17. An opening 454 is formed in the tone arm to allow one of the needles to extend upwardly and rearwardly therethrough. It is to be noted that a pair of micro-needles 456 are disposed in alignment in the grooves 442 and a pair of conventional needles 458 are disposed in alignment in the interposing grooves. Thus, the needles extend in a diagonal plane above and below the tone arm, so that the downwardly extending needle may contact the top surface of a record disposed on the turntable, while the upwardly extending needle contacts the sound track on the underside of a record disposed on the connecting rollers. It is to be noted that the rollers reverse the rotative path of the record from the driving turntable, so that the upper needle extends rearwardly, while the lower needle extends forwardly. An arm 456 is pivotally carried by the top of the tone arm head and is adapted to swing across the slot 454 and be locked thereacross by a locking detent construction 458, so as to align the upwardly extending needle in a proper and vertical position.

A pair of complementary arms 460 project laterally from the tone arm, at the head portion thereof, and support a roller 462 rotatably journaled at the outer ends thereof. The roller is provided, so that when the tone arm swings inwardly, any possible contact between the periphery of the records and the tone arm is prevented.

The tone arm is rotatively pivoted for horizontal and vertical swinging movement, so that the tone arm is swung inwardly and outwardly in a horizontal plane and upwardly and downwardly in a vertical plane.

Attention is now directed to Figures 28–31, wherein the supporting and operating means for the tone arm is illustrated. A U-shaped supporting member 464 is integrally formed on the upper end of a hollow shaft 466 and an enlarged housing 468 is interposed in the shaft, with the shaft terminating at its lower end in a solid extremity 470. The end 470 is rotatively disposed in a tubular post 472, which extends upwardly from a base plate 474 secured on the bottom of the casing. The tone arm is pivotally secured to the opposing sides of the member 464 by rivets 476, as seen in Figure 16. A pair of longitudinally spaced transversely extending rods 478 and 480 are carried by the tone arm and a pair of flexible operating members 482 and 484 are secured by clips 486 on the rods. The opposing ends of the operating members 482 and 484 are secured to the ends of a triangular control plate 486 which is pivotally disposed at its apex on a shaft 488 journaled in the housing 468. A segmental gear 490 is integrally formed on one side of the plate in intermeshing engagement with a gear 491 which is mounted on a shaft 492 and spaced from one side of the housing by a sleeve 494. Resilient stops 493 are provided for the plate. The shaft 492 is connected to a flexible operating rod 495 which is protectively disposed in a tubing 496 and extends from the gear box 222 in an operative manner, as seen in Figure 11. Thus, as the segment 490 is oscillated by the gear 491, the operating members 482 and 484 are correspondingly moved upwardly and downwardly, the operating members moving over guide members 498 disposed in the supporting member 464. A chain drive 500 is operatively disposed between the gear box and timer and a sprocket 502 is secured on a shaft 504 which is rotatively journaled in a suitable supporting plate. A gear 506 is carried by the shaft and is disposed in intermeshing engagement of a splined shaft 508 which is vertically journaled in a U-shaped bracket 511 extending downwardly from the top 14 of the casing. A gear segment 510 is integrally formed on the shaft 466 and is oscillated by the splined shaft 508, so that rotation of the shaft 508 in selective clockwise and counterclockwise rotative paths, due to the forward and reverse drive of the chain transmission mechanism oscillates the segment 510 and swings the tone arm in a horizontal plane inwardly and outwardly relative to the spindle.

Figure 28:
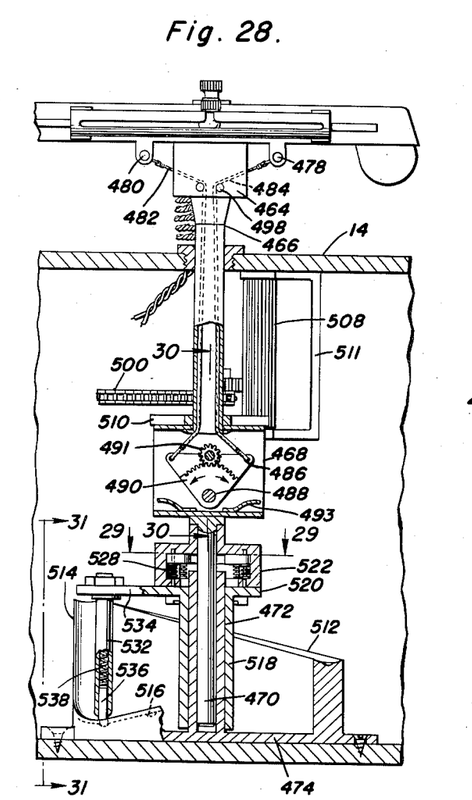
Figure 28 is a side elevational view of a portion of the tone arm and control apparatus, the latter being shown in section.
Figure 29:
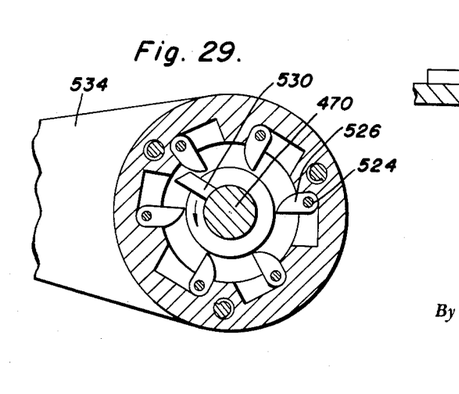
Figure 29 is a transverse sectional view taken on line 29—29 of Figure 28.
Figure 30:
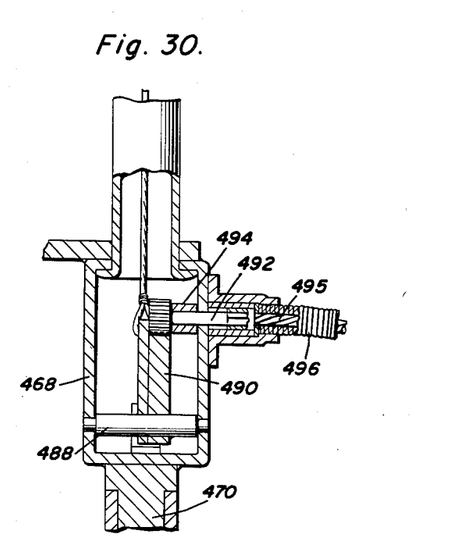
Figure 30 is a sectional view taken on line 30—30 of Figure 28.
Figure 31:
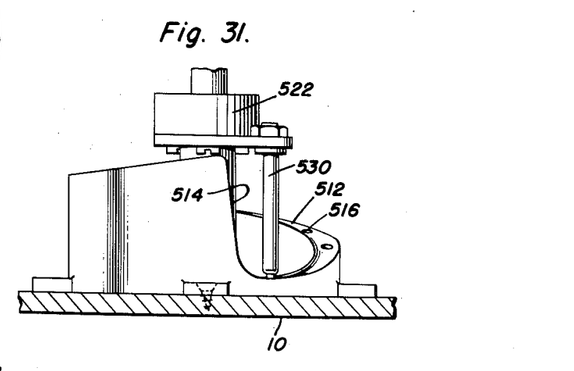
Figure 31 is a sectional view taken on line 31—31 of Figure 28.

An elevated cam path 512 extends gradually upwardly in a spiral path from the base 474 to define a raising trackway which terminates in an abrupt downwardly inclined return path 514. A series of spaced recesses 516 are formed along the raising path. A sleeve 518 is slidably and rotatably disposed concentrically about the sleeve 472 and terminates at its upper end in a lateral flange 520 which forms a closure plate for a housing 522, the housing being disposed about the upper end of the shaft 470 below the housing 468. A plurality of vertical pins 524 are disposed in the housing and support at their upper ends ratchet teeth 526, springs 528 embracing the pins and permitting movement of the teeth or dogs in one direction only. A finger 530 extends laterally from the shaft 470 and is adapted to strike against one of the teeth 526 and rotate the sleeve 518 about the sleeve 472. The finger 530 rotates with the shaft 470, so that each time the shaft is oscillated outwardly, the finger in contact with one of the teeth moves the sleeve 518. A tubular member 532 extends downwardly from the arm 534 which extends laterally from the flange 520 on the sleeve 518. A pin 536 is urged by a spring 538 downwardly from the tubular member and defines a cam follower slidably engageable along the cam path. The spring urges the follower pin into the recesses as the arm is moved about the cam track. It is, therefore, obvious that the entire assembly supporting the tone arm is progressively moved upwardly corresponding with the progressive upward movement of the arms 104 and 170 to allow the records to become stacked on the turntable.

Means is provided for retaining one of the styluses under pressure and in engagement of the sound track of the record to be played, the means being automatic and also manually operated. Thus, attention is directed to Figures 15–20, wherein it is to be noted that an elongated split sleeve 540 is secured at is opposing ends by straps 542 to one side of the tone arm. The sleeve is provided with a longitudinally extending slot 544 in the outer wall thereof. A rod 546, which extends at its ends beyond the sleeve, is slidably and rotatably disposed within the sleeve. A weight 547 is slidably and rotatably disposed on the rod 546 and is adapted for sliding movement on the rod. The weight is formed with a laterally extending externally threaded lug 548 upon which is threaded a locking nut 550. A laterally extending slot 522 communicates centrally with the longitudinally extending slot 544. Thus, the weight can freely slide on the rod or it can be locked in selected positions thereon.

A tube 554, which may be filled with mercury or similar substance, is pivotally disposed between a pair of downwardly extending perforated legs 556 of a U-shaped bracket 558. The tube is pivoted about a horizontal pivot 560 between the legs. A locking and adjusting structure 562 is slidably disposed through a slot 564 formed in the tone arm and is connected to the web of the bracket 558, so as to adjust the longitudinal position of the tube within the tone arm. The tube is formed centrally with a protruding section 566, as seen in Figure 17. The tube being pivotally disposed on a horizontal axis as at 560 is automatic in operation to impart a sustaining pressure to the styluses.

Figure 21:
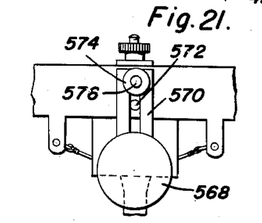
Figure 21 is a fragmentary side elevational view of a modified form of means for retaining the stylus under pressure on the sound track.

Another embodiment of this means is illustrated in Figure 21, wherein it is to be noted that a pendulum 568 is carried by a slotted arm 570, the arm being slidable on a lug 572 extending laterally from the tone arm and being secured by a locking nut 574 secured on an externally threaded lug 576 which extends laterally from the side wall tone arm. The pendulum structure may either be preset in an angular position or allowed to freely oscillate on the tone or pickup arm.

Since many other modifications and purposes of this invention will become apparent to those skilled in the art, upon a perusal of the foregoing disclosure, in view of the accompanying drawings, it is to be understood that certain changes in size, style and arrangement of parts may be effected thereon, without a departure from the spirit of the invention and within the scope of the appended claims.

Having described the invention, what is claimed as new is:

1. An automatic record changing and playing mechanism comprising a frame, a turntable rotatably mounted on the frame, a reproducer including a pickup arm for reproducing sounds from records rotated by the turntable, means for swinging the pickup arm about a vertical and horizontal axis, a stationary spindle supported by the frame concentrically with the turntable for supporting a plurality of records at their centers, means disposed parallel with the spindle for supporting the records stacked above the turntable and releasing the records one by one, drive and spacing means disposed adjacent the turntable for horizontal swinging movement relative to the spindle, said last means operatively being connective with the turntable for supporting and rotating the lowermost record from the stack, the record being supported in a parallel plane above the turntable, means disposed adjacent the turntable for retaining the record under pressure in driven engagement of the drive means, and means carried by the spindle for raising the record from the drive means to allow the drive means to swing outwardly beyond the periphery of the turntable and for then lowering said record into interlocking placement on the turntable.

2. An automatic record changing and playing mechanism comprising a frame, a turntable rotatably mounted on the frame, a reproducer including a pickup arm for reproducing sounds from records rotated by the turntable, means for swinging the pickup arm about a vertical and horizontal axis, a stationary spindle supported by the frame concentrically with the turntable for supporting a plurality of records at their centers, means disposed parallel with the spindle for supporting the records stacked above the turntable and releasing the records one by one, drive and spacing means disposed adjacent the turntable for horizontal swinging movement relative to the spindle, said last means operatively being connective with the turntable for supporting and rotating the lowermost record from the stack, the record being supported in a parallel plane above the turntable, means disposed adjacent the turntable for retaining the record under pressure in driven engagement of the drive means, means carried by the spindle for raising the record from the drive means to allow the drive means to swing outwardly beyond the periphery of the turntable and for then lowering said record into interlocking engagement with the turntable, and synchronized operating means for all of said foregoing means and pickup arm.

3. In an automatic phonographic apparatus, a turntable, means for driving said turntable in a unidirectional rotation, driving and spacing means disposed adjacent the turntable for inward movement to a rested and driven position upon the turntable or a stack of records upon the turntable, said means having a supporting and driving engagement with a record at the central portion thereof and within the sound track of the same for rotating the latter unidirectionally in an opposite direction of rotation from that of the turntable, a tone arm operatively associated with said turntable, said means having an interlocking, toothed and non-slipping driven and driving engagement respectively with complementary toothed surfaces upon both the turntable or a record thereon and the record supported by said means.

4. In an automatic phonographic apparatus, a turntable, means for driving said turntable in a unidirectional rotation, driving and spacing means disposed adjacent the turntable for inward movement to a rested and driven position upon the turntable or a stack of records upon the turntable, said driving and spacing means having a supporting and driving engagement with a record within the sound track of the same for rotating the latter unidirectionally in an opposite direction of rotation about the turntable, a tone arm operatively associated with said turntable, said driving and spacing means including a plurality of toothed rollers, said toothed rollers being engageable with a toothed surface within the sound track of a record for supporting and driving the same and with a toothed surface of the turntable for driving the rollers therefrom, a member supporting and journaling said rollers.

5. The combination of claim 4 including pressure means engaging within its sound track a record supported by said driving and spacing means for urging said record downwardly upon said rollers.

6. The combination of claim 5 wherein said pressure means includes a supporting arm having a pressure head for applying pressure to a record within the sound track of the same, means for imparting timed vertical and horizontally swinging movement to said supporting arm.

7. The combination of claim 3 including pressure means engaging at the central portion thereof and within its sound track a record supported by said driving and spacing means for urging said record downwardly upon said rollers.

8. The combination of claim 7 wherein said pressure means includes a supporting arm, having a pressure head for applying pressure to a record within the sound track of the same, means for imparting timed vertical and horizontally swinging movement to said supporting arm.

9. The combination of claim 1 including means for supporting and lowering records released by said record supporting means to said driving and spacing means.

10. The combination of claim 2 including means for supporting and lowering records released by said record supporting means to said driving and spacing means.

11. The combination of claim 1 including means for supporting and lowering records released by said record supporting means to said driving and spacing means, a spindle, said supporting and lowering means being slidably disposed in said spindle.

12. The combination of claim 2 including means for supporting and lowering records released by said record supporting means to said driving and spacing means, a spindle, said supporting and lowering means being slidably disposed in said spindle.

References Cited in the file of this patent

UNITED STATES PATENTS

| | | |
|---|---|---|
| 989,544 | Graft | Apr. 11, 1911 |
| 1,940,089 | Harrison | Dec. 19, 1933 |
| 2,043,789 | Ansley | June 9, 1936 |
| 2,068,449 | Dawns | Jan. 19, 1937 |
| 2,159,836 | Alm | May 23, 1939 |
| 2,291,158 | Holstensson et al. | July 28, 1942 |
| 2,307,030 | Erwood | Jan. 5, 1943 |
| 2,318,654 | Wessner | May 11, 1943 |
| 2,328,641 | Glaser | Sept. 7, 1943 |
| 2,387,916 | Knox et al. | Oct. 30, 1945 |
| 2,457,668 | Hart | Dec. 28, 1948 |
| 2,506,926 | Johnson | May 9, 1950 |
| 2,512,701 | Weaver | June 27, 1950 |
| 2,529,438 | Wennerbo | Nov. 7, 1950 |
| 2,544,010 | Giannantonio | Mar. 6, 1951 |
| 2,550,794 | Fisher | May 1, 1951 |
| 2,555,895 | Lynch | June 5, 1951 |
| 2,555,910 | Wilber | June 5, 1951 |
| 2,559,786 | Mueller | July 10, 1951 |
| 2,622,885 | Mullaney et al. | Dec. 23, 1952 |

FOREIGN PATENTS

| | | |
|---|---|---|
| 102,325 | Switzerland | Nov. 16, 1923 |
| 541,156 | Great Britain | Nov. 14, 1941 |
| 111,950 | Sweden | Sept. 26, 1944 |
| 63,231 | Denmark | Mar. 5, 1945 |